(12) United States Patent
Otsubo et al.

(10) Patent No.: US 7,971,852 B2
(45) Date of Patent: Jul. 5, 2011

(54) SEAL STRUCTURE OF HIGH-PRESSURE TANK

(75) Inventors: Hirokazu Otsubo, Toyota (JP); Chihiro Uchimura, Toyota (JP); Nobuo Kobayashi, Toyota (JP); Nobuyuki Ogami, Anjo (JP); Akira Yamashita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 686 days.

(21) Appl. No.: 11/794,139

(22) PCT Filed: Jan. 24, 2006

(86) PCT No.: PCT/JP2006/301389
§ 371 (c)(1),
(2), (4) Date: Jun. 26, 2007

(87) PCT Pub. No.: WO2006/082765
PCT Pub. Date: Aug. 10, 2006

(65) Prior Publication Data
US 2008/0111322 A1 May 15, 2008

(30) Foreign Application Priority Data
Feb. 2, 2005 (JP) .................... 2005-026644

(51) Int. Cl.
*F16K 51/00* (2006.01)
(52) U.S. Cl. ............. 251/144; 251/214; 220/581
(58) Field of Classification Search ............ 251/144, 251/214; 277/914, 929; 220/581, 582, 586, 220/303, 304, 901, 661, 601; 285/351, 187
See application file for complete search history.

(56) References Cited

U.S. PATENT DOCUMENTS

| | | | | |
|---|---|---|---|---|
| 3,419,180 A | * | 12/1968 | Homrig et al. | 220/235 |
| 3,606,348 A | * | 9/1971 | Taylor | 277/328 |
| 3,845,974 A | | 11/1974 | Pelloux-Gervais | |
| 3,917,115 A | * | 11/1975 | Travers et al. | 222/3 |
| 4,379,557 A | * | 4/1983 | Saka | 277/516 |
| 6,173,729 B1 | | 1/2001 | Dey et al. | |
| 6,264,247 B1 | | 7/2001 | Lombari et al. | |
| 6,306,191 B1 | * | 10/2001 | McInerney et al. | 55/385.4 |
| 6,322,086 B1 | * | 11/2001 | Yokomachi et al. | 277/608 |
| 2002/0145285 A1 | * | 10/2002 | Katayama et al. | 285/423 |

(Continued)

FOREIGN PATENT DOCUMENTS
AT 287659 B 2/1971

(Continued)

*Primary Examiner* — John K Fristoe, Jr.
*Assistant Examiner* — Marina Tietjen
(74) *Attorney, Agent, or Firm* — Kenyon & Kenyon LLP

(57) ABSTRACT

Disclosed is a seal structure of a high-pressure tank capable of properly securing seal efficiency. The seal structure of the high-pressure tank includes a plurality of seal members that have mutually different seal properties and that are installed between a ferrule of the high-pressure tank and a valve body attached to the ferrule. One of the plurality of seal members has low temperature resistance, and the other has high temperature resistance. A first seal member is an O-ring formed of butyl rubber or silicone. A second seal member is an O-ring formed of EPDM. Furthermore, the two O-rings are different in gas permeability from each other. This seal structure can be applied between the ferrule and the valve body, in addition, between the ferrule and a liner, between the ferrule and a shell, and between the valve body and the shell.

6 Claims, 5 Drawing Sheets

U.S. PATENT DOCUMENTS

| | | | |
|---|---|---|---|
| 2003/0189053 A1* | 10/2003 | Felbaum | 220/582 |
| 2005/0156388 A1* | 7/2005 | Takano | 277/628 |
| 2007/0273106 A1* | 11/2007 | Nomichi et al. | 277/558 |

FOREIGN PATENT DOCUMENTS

| | | | |
|---|---|---|---|
| DE | 715331 A | | 12/1941 |
| DE | 7302910 U | | 11/1973 |
| DE | 44 40 663 C2 | | 9/1997 |
| DE | 10 2004 028 029 A1 | | 8/2006 |
| JP | 2000-161590 A | | 6/2000 |
| JP | 2002-144894 A | | 5/2002 |
| JP | 2002-228003 A | | 8/2002 |
| JP | 2002-228078 A | | 8/2002 |
| JP | 2002-313388 A | | 10/2002 |
| JP | 2002-317764 A | | 10/2002 |
| JP | 2002-349796 A | | 12/2002 |
| JP | 2003-279000 A | | 10/2003 |
| JP | 2004-239124 A | | 8/2004 |
| JP | 2004-301173 A | | 10/2004 |
| JP | 2004-308795 A | | 11/2004 |
| JP | 2005-003110 A | | 1/2005 |
| JP | 2005-048918 A | | 2/2005 |
| JP | 2005-048919 A | | 2/2005 |
| JP | 2005-090625 A | | 4/2005 |
| JP | 2005-121128 | * | 5/2005 |
| JP | 2005-291434 A | | 10/2005 |

* cited by examiner

SEAL STRUCTURE OF HIGH-PRESSURE TANK

This is a 371 national phase application of PCT/JP2006/301389 filed 24 Jan. 2006, claiming priority to Japanese Patent Application No. 2005-026644 filed 2 Feb. 2005, the contents of which are incorporated herein by reference.

TECHNICAL FIELD

The present invention relates to a structure in which an attachment member is attached to an opening of a tank subjected to a high-pressure tank, and relates to, for example, a seal structure of the high-pressure tank provided between a ferrule defining an opening and a valve body constituting the attachment member.

BACKGROUND ART

A high-pressure tank in which gas such as hydrogen gas is stored under high pressure is mounted on, for example, a fuel cell vehicle. A ferrule of the high-pressure tank is disposed at an opening of a tank body, and the opening is provided at an end portion of the high-pressure tank (see, e.g., Patent Document 1). Moreover, a valve body having a piping element such as a valve, incorporated therein, is screwed in and connected to the opening of this type of ferrule. To secure sealing capability of the high-pressure tank, seal members are disposed between the ferrule and the tank body or between the ferrule and the valve body (see, e.g., Patent Documents 1 to 3). For example, in Patent Document 1, as a seal system for improving this type of sealing capability, a double seal structure is adopted in which axial sealing is provided by two O-rings.

[Patent Document 1] Japanese Patent Application Laid-Open No. 2000-161590 (FIG. 3)
[Patent Document 2] Japanese Patent Application Laid-Open No. 2003-279000 (FIGS. 2 through 4)
[Patent Document 3] Japanese Patent Application Laid-Open No. 2002-349796 (FIG. 2)

DISCLOSURE OF THE INVENTION

Incidentally, with a high-pressure tank in which a tank internal pressure ranges from 20 MPa to 100 MPa, a rapid temperature change occurs owing to adiabatic compression and expansion during filling of the tank with gas and discharging of the gas. For example, a rapid temperature rise is involved during the filling of hydrogen gas, and a rapid temperature drop is involved during the discharging of the gas. Owing to this temperature change (in particular, a lowering of temperature), elasticity of a seal member made of a rubber is reduced to deteriorate sealing capability thereof. In this point, the above patent documents have paid no consideration, although the double seal structure is mentioned. Moreover, as measures against a gas leakage from the tank, the above patent documents have proposed such a constitution that a plurality of seal members having the same properties is arranged in series. Nevertheless, a further improvement has been earnestly demanded.

An object of the present invention is to provide a seal structure of a high-pressure tank capable of properly securing sealing capability. In accordance with one aspect of the present invention, an object of the present invention is to provide a seal structure of a high-pressure tank capable of properly securing sealing capability over a broad temperature range.

To achieve the above object, according to the present invention, a seal structure of a high-pressure tank between an opening of the high-pressure tank and an attachment member attached to the opening has a plurality of seal members with mutually different seal properties. The plurality of seal members are installed between an opening edge portion defining the opening and the attachment member.

With this constitution, for example, in a given temperature environment, even if the elasticity of one of the seal members is reduced, the other seal members can keep the sealing capability without causing a reduction in the elasticity thereof. Thus, as the plurality of seal members are allowed to possess mutually different seal properties, the sealing capability between the opening of the high-pressure tank and the attachment member can be secured.

Here, the opening and the opening edge portion may be configured of a ferrule, and the attachment member may be constituted of a functional component attached to the opening of the ferrule. The functional component includes piping elements such as a valve, a joint, and a pipe defining a passage for a fluid, and includes detection elements such as a pressure sensor and a temperature sensor. For example, in a case where the functional component is a valve body in which piping elements such as the valve are integrally incorporated, the sealing capability between the ferrule and the valve body can be secured.

Moreover, the opening and the opening edge portion are constituted of either an inner shell or an outer shell of the high-pressure tank, and the attachment member may be constituted of either a ferrule or a functional component such as a valve body attached to the opening of the inner shell or the outer shell. Therefore, the seal structure of the present invention can be applied between the inner shell of the high-pressure tank and the ferrule, between the inner shell of the high-pressure tank and the valve body, between the outer shell of the high-pressure tank and the ferrule, or between the outer shell of the high-pressure tank and the valve body and the like.

In one preferred embodiment of the present invention, the plurality of seal members are different in temperature characteristics thereof from each other.

According to this configuration, the high-pressure tank subjecting to temperature changes with filling and discharging can securely be sealed over the broad temperature range.

In one preferred embodiment of the present invention, the plurality of seal members include a first seal member having low temperature resistance and a second seal member having high temperature resistance.

From another aspect, in one preferred embodiment of the present invention, the plurality of seal members include a first seal member and a second seal member, the first seal member causes less leakage than the second seal member at a first temperature, and the second seal member causes less leakage than the first seal member at a second temperature higher than the first temperature.

According to such a configuration, the sealing capability between the opening of the high-pressure tank and the attachment member is secured by the first seal member in a case where the temperature in the high-pressure tank drops, and secured by the second seal member in a case where the temperature in the high-pressure tank rises. Hence, even in a temperature environment where the elasticity of one of the seal members is reduced, the elasticity of the other seal member effectively functions. Therefore, the sealing capability between the opening and the attachment member can be secured over the broad temperature range.

It is to be noted that a given temperature at which the seal member causes less leakage will hereinafter be described in accordance with the first temperature as one example. That is, when the seal member causes less leakage at the first temperature, it is indicated that the first seal member is more easily elastically deformed than the second seal member at the first temperature. However, this condition is not necessarily a sufficient condition, and a gas permeability of a material per se and the like have to be taken into consideration in some case.

Here, as the first seal member, the existing gasket or O-ring can effectively be used, and it is preferable that the material is formed of, for example, butyl rubber or silicone. Similarly, as the second seal member, the existing gasket or O-ring can effectively be used, and it is preferable that the material is formed of, for example, ethylene propylene diene monomer rubber (EPDM). When these materials form the seal members, the above-mentioned temperature characteristics are preferably exhibited, and the leakage can adequately be suppressed. It is to be noted that in a more preferable combination of the seal members, the first seal member is of silicone, and the second seal member is of EPDM.

In one preferred embodiment of the present invention, the first seal member is positioned internally from the second seal member as viewed from the inside of the high-pressure tank.

In general, since the number of repetition of the discharging of the gas is larger than that of the filling of the gas in the high-pressure tank, the temperature in the high-pressure tank drops more frequently as compared with a case where the temperature rises. As the first seal member having the low temperature resistance is positioned internally (on an upstream side) as viewed from the inside of the high-pressure tank as in the above constitution, the sealing capability according to the seal member having a higher frequency in use can be surely provided.

Unlike the above aspect, from another aspect, in one preferred embodiment of the present invention, the first seal member may be positioned externally from the second seal member as viewed from the inside of the high-pressure tank.

According to this embodiment, even if the second seal member fails to function, the first seal member can secure the sealing capability.

In one preferred embodiment of the present invention, the first and second seal members are different in their gas permeability from each other. The seal member having a higher gas permeability in the first and second seal members is positioned externally from the seal member having low gas permeability as viewed from the inside of the high-pressure tank.

According to a further aspect of the present invention, in one preferred embodiment of the present invention, the plurality of seal members may include first and second seal members which are different in gas permeability from each other, and the first seal member has the gas permeability higher than that of the second seal member, and is positioned externally from the second seal member as viewed from the inside of the high-pressure tank.

According to this configuration, the gas can be prevented from being accumulated between the first and second seal members. As the seal member having higher gas permeability is positioned externally (on a downstream side) as viewed from the inside of the high-pressure tank, reliability of sealing can be improved.

Here, in the above-mentioned combination of silicone and EPDM, it is preferable that the second seal member formed of EPDM having comparatively low gas permeability is positioned internally from the first seal member formed of silicone having comparatively high gas permeability as viewed from the inside of the high-pressure tank. Conversely, in the combination of butyl rubber and EPDM, it is preferable that the first seal member formed of butyl rubber having comparatively low gas permeability is positioned internally from the second seal member formed of EPDM having comparatively high gas permeability as viewed from the inside of the high-pressure tank.

In one preferred embodiment of the present invention, the first seal member and the second seal member are arranged in series between an inner peripheral surface of the opening edge portion and an outer peripheral surface of the attachment member along an axial direction of the high-pressure tank.

According to this configuration, since both of the first and second seal members function as an axial seal, the reliability of the sealing can be improved as compared with the materials functioning as an end face seal.

In one preferred embodiment of the present invention, attachment grooves in which the first and second seal members are individually arranged are formed in at least one of the inner peripheral surface of the opening edge portion and the outer peripheral surface of the attachment member.

According to this configuration, since two seal members do not interfere with each other, the sealing capability can preferably be improved.

According to another aspect, in one preferred embodiment of the present invention, a single attachment groove in which both of the first and second seal members are arranged may be formed in at least one of the inner peripheral surface of the opening edge portion and the outer peripheral surface of the attachment member.

According to this configuration, two seal members could interfere with each other, but an efficiency in occupation of a spacing around these seal members can be improved, and a reduction in weight can be achieved.

In one preferred embodiment of the present invention, a backup ring is further provided in the attachment groove.

According to this constitution, since the backup ring is also used, the sealing capability at a high pressure can be improved.

Moreover, as described above, in one embodiment of the present invention, when the opening and the opening edge portion are constituted of a ferrule and the attachment member is comprised of a valve body, it is preferable to adopt the following configuration.

Namely, it is preferable that the valve body has a thread portion to be screwed to the opening edge portion, and the plurality of seal members are positioned on opposite sides of the thread portion in an axial direction thereof.

As described above, with the high-pressure tank and the valve body, the temperature changes with the filling and discharging, and thus, at this time, the valve body may have a non-uniform temperature distribution in the axial direction of the body in some case. Nevertheless, according to the above-mentioned configuration, any adverse influence due to the described temperature distribution in the valve body can adequately be avoided as compared with a case where the seal members are arranged at one end of the thread portion in a concentrated manner. In consequence, it is possible to obtain a tightening force which is consistent with the sealing capability.

In this case, it is preferable that the valve body has a plurality of portions having different diameters in the axial direction of the body, the plurality of seal members are formed depending on the diameter of the valve body, and the seal member disposed externally from the thread portion as viewed from the inside of the high-pressure tank has a larger diameter in comparison with that of the seal member disposed internally from the thread portion.

In accordance with the seal structure of the high-pressure tank of the present invention described in the foregoing, the sealing capability can adequately be secured.

BEST MODE FOR CARRYING OUT THE INVENTION

A seal structure of a high-pressure tank according to a preferred embodiment of the present invention will hereinafter be described with reference to the accompanying drawings. This seal structure may be a double seal structure between an opening of the high-pressure tank and an attachment member attached to this opening, but in this case, two seal members are constituted of materials different in temperature characteristic from each other. In the following first through fourth embodiments, an opening of a ferrule will be described as an example of the opening of the high-pressure tank, and a valve body will be described as an example of the attachment member.

First Embodiment

Figure 1:
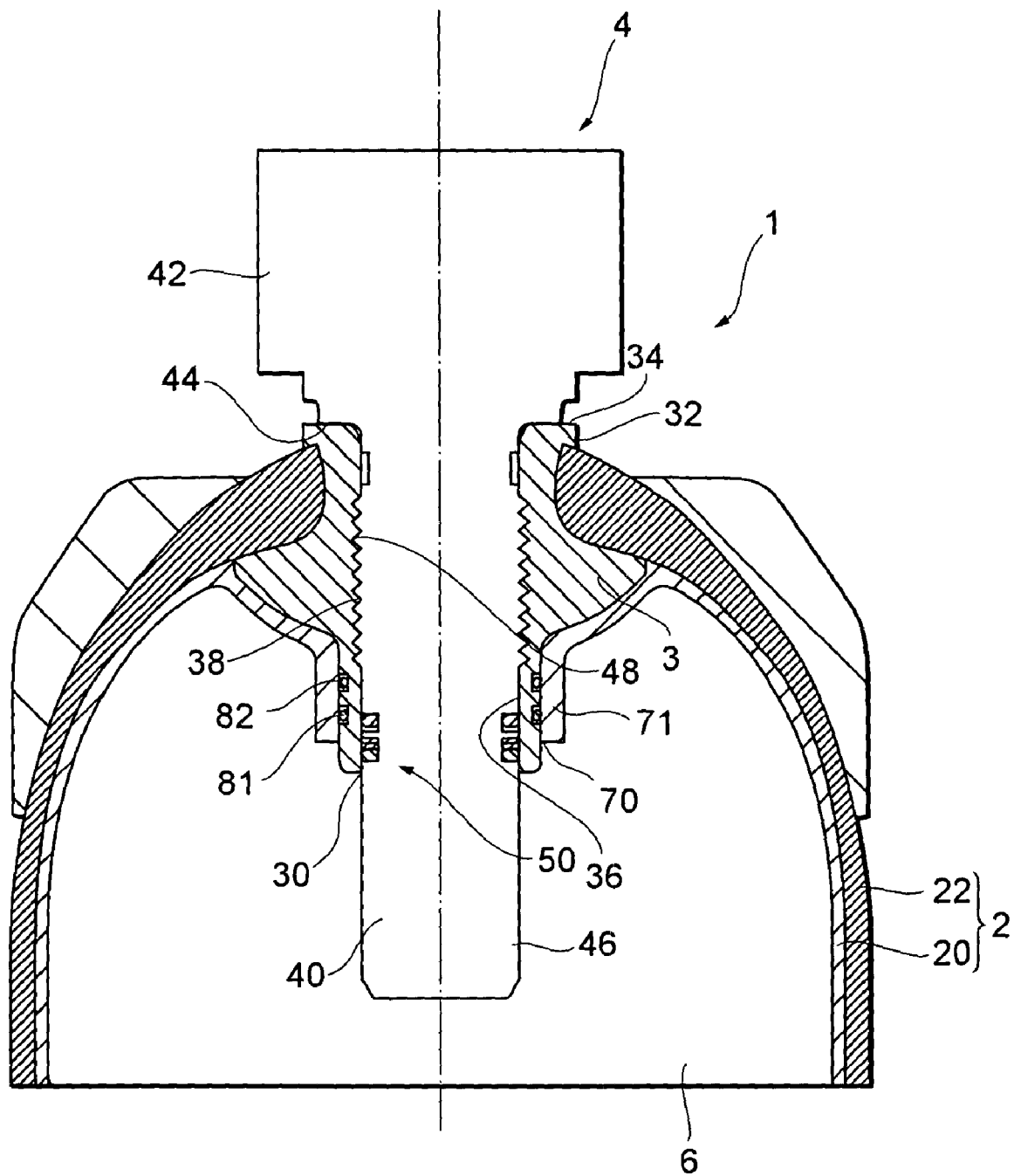
FIG. 1 is a cross-sectional view showing a configuration of a high-pressure tank according to a first embodiment.

As shown in FIG. 1, a high-pressure tank 1 includes a tank body 2 having a sealed cylindrical shape as a whole, a ferrule 3 disposed at one end portion of the tank body 2 in a longitudinal direction, and a valve body 4 attached to the ferrule 3. An interior of the tank body 2 is provided as a storage space 6 in which various gases such as natural gas and hydrogen gas under a high pressure are stored. When the high-pressure tank 1 is applied to a fuel cell system, hydrogen gas of, for example, 35 MPa or 70 MPa, or CNG gas (compressed natural gas) of 20 MPa is stored in the storage space 6. The high-pressure tank 1 of the present invention may be applied not only to a gas tank but also to a liquid hydrogen tank and an MH (a metal hydride alloy) tank.

The tank body 2 is comprised of a double structure including an inner liner 20 (an inner shell) having a gas barrier property, and a shell 22 (an outer shell) made of FRP which covers the outside of the liner 20. The liner 20 is made of a resin such as high-density polyethylene. The tank body 2 is made of the resin in this manner. However, needless to say, the tank body 2 may be made of a metal such as an aluminum alloy. Alternatively, the liner 20 may be made of a metal such as aluminum, and the shell 22 may be made of a resin. The ferrule 3 is made of a metal such as stainless steel, and disposed at the center of a semi-spherical end wall portion of the tank body 2.

The valve body 4 (an attachment member) is formed of a metal such as stainless steel. The valve body 4 is screwed into and connected to an opening 30 of the ferrule 3, when attached to the opening 30. The valve body 4 of the present embodiment is constituted as a valve assembly in which piping elements such as a valve and a joint are integrally incorporated. The valve constituting the valve assembly is comprised of, for example, a shut valve as a source valve and a regulating valve disposed in series with the shut valve.

It is to be noted that the valve body 4 may have a pressure sensor and a temperature sensor in addition to these types of valves and a gas conduit. The functional component screwed into and connected to the ferrule 3 is not limited to the valve body 4, and may be piping elements such as a single valve and a pipe joint, a piping constituting a gas conduit and detection elements such as a pressure sensor and a temperature sensor.

The valve body 4 is constituted of a cylindrical portion 40 (an axial center portion) positioned in the tank body 2, and an exposed portion 42 positioned outside the tank body 2 so that it is disposed both inside and outside the tank body 2. The cylindrical portion 40 and the exposed portion 42 are provided with a gas conduit (not shown) connected to the storage space 6 and an external gas line in addition to the above-mentioned valve.

The gas of the storage space 6 is discharged (supplied) to an external gas supply line via a gas channel and a valve of the valve body 4. However, when the gas is, for example, hydrogen gas, a temperature in the tank body 2 drops. It is to be noted that in the tank body 2, hydrogen gas of 70 MPa drops to a temperature lower than that of hydrogen gas of 35 MPa. On the other hand, the storage space 6 is filled with the gas from an external gas filling line through the gas conduit and the valve of the valve body 4. However, for example, when the gas is hydrogen gas, the temperature in the tank body 2 rises.

An annular lower end face 44 of the exposed portion 42 is disposed on an upper end face 34 of a flange portion 32 of the ferrule 3 extended to the outside of the tank body 2. An external screw thread 48 is formed in an outer peripheral surface 46 of the cylindrical portion 40 on an exposed portion 42 side, whereas an internal screw thread 38 is formed in an inner peripheral surface 36 of the opening 30 in the ferrule 3. The cylindrical portion 40 is slate-screw connected to the opening 30 in the ferrule 3 via this thread portion. A space between the cylindrical portion 40 and the ferrule 3 is airtightly sealed with sealing means 50 at an inner position of the external screw 48 (on a side opposite to the exposed portion 42).

Figure 2:
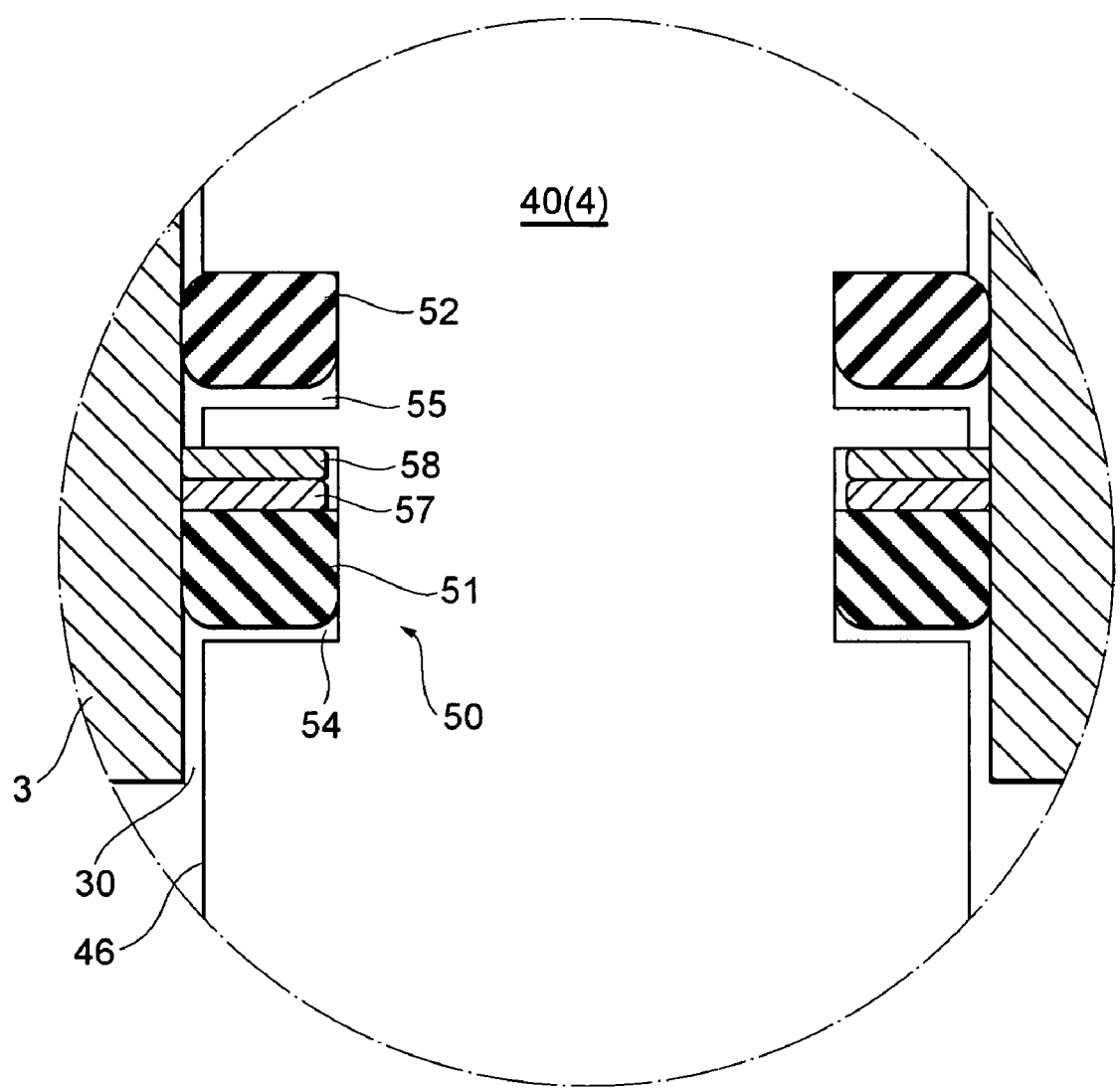
FIG. 2 is an enlarged view showing a main part of a seal structure around a ferrule and a valve body according to the first embodiment.

As shown in FIG. 2, the sealing means 50 has two O-rings 51 and 52 which axially seal a space between the ferrule 3 and the valve body 4. Two O-rings 51 and 52 are arranged between the outer peripheral surface 46 of the cylindrical portion 40 of the valve body 4 and the inner peripheral surface 36 (an opening edge portion) of the opening 30 of the ferrule 3.

Positions of the two O-rings 51 and 52 are arranged in series along a direction of a center axial of the valve body 4. In detail, the first O-ring 51 is disposed internally (on an upstream side, on a primary side) as viewed from the inside of the high-pressure tank 1, and the second O-ring 52 is disposed externally (on an exposed portion 42 side, on a downstream side and on a secondary side) as viewed from the inside of the high-pressure tank 1. The two O-rings 51 and 52 have a predetermined collapse allowance, respectively, and fitted in two annular fitting grooves 54 and 55 arranged in the outer peripheral surface 46 of the cylindrical portion 40, respectively. It is to be noted that the two attachment grooves 54 and 55 may be formed in the inner peripheral surface 36 of the opening 30 in the ferrule 3.

Ordinarily, as leakage of gas from the high-pressure tank 1, two types of permeation amounts are considered which include an amount of gas to permeate from a portion where the sealing means 50 comes into close contact with the valve body 4 or the ferrule 3 and an amount of gas to permeate the seal member as the sealing means 50 in a thickness direction. Therefore, to select a material of the two O-rings 51 and 52, it is desirable to take an account of a total amount of two types of gas permeation amounts. As described above, since the temperature in the high-pressure tank 1 fluctuates, it is preferable to select the material so that the two O-rings 51 and 52 are different in temperature characteristic.

In the present embodiment, the two O-rings 51 and 52 have seal characteristics (properties) such as temperature characteristics and gas permeability which are different from each other. Specifically, the first O-ring 51 is formed of a material excellent in low temperature characteristic (resistance to the cold) as compared with the second O-ring 52. Moreover, the first O-ring is formed of the material having low gas permeability. For example, the first O-ring 51 is formed of butyl rubber (IIR), and has low temperature resistance (excellent low temperature characteristic) and resistance to gas permeation (gas non-permeability). The second O-ring 52 is formed of, for example, ethylene propylene diene monomer rubber (EPDM) and has high temperature resistance (excellent high temperature characteristic) and resistance to weather.

Here, the "low temperature resistance" of the first O-ring 51 means that elasticity of the first O-ring 51 is not reduced or is suppressed at the temperature in the tank body 2 which has dropped with, for example, discharging of the gas (discharging of a hydrogen gas). Similarly, the "high temperature resistance" of the second O-ring 52 means that elasticity of the second O-ring 52 is not reduced or is suppressed at the temperature in the tank body 2 which has risen with, for example, filling with the gas (filling with the hydrogen gas). The two O-rings 51 and 52 have a temperature characteristic such that the elasticity is not reduced at a standby time of the high-pressure tank 1 when the discharging of the gas or the filling with the gas is not performed, that is, in a case where the temperature in the tank body 2 is room temperature.

As described above, in consideration of the temperature change in the high-pressure tank 1, the first O-ring 51 having such a property that the ring causes less leakage than the second O-ring 52 at a first temperature is used together with the second O-ring 52 having such a property that the ring causes less leakage than the first O-ring 51 at a second temperature higher than the first temperature. Since the high-pressure tank 1 is sealed in this manner, the leakage of the gas from the high-pressure tank 1 can effectively be suppressed.

Reference numerals 57 and 58 in the drawing denote two backup rings arranged adjacent to the attachment groove 54 to which the first O-ring 51 is attached. The two backup rings 57 and 58 are arranged on a downstream side (a low pressure side) of the first O-ring 51, and the one backup ring 57 is disposed adjacent to the first O-ring 51. It is to be noted that one or two backup rings may be arranged not only on only one side of the first O-ring 51 but also on opposite sides of the first O-ring 51. The backup ring may be disposed in the fitting groove 55 of the second O-ring 52.

As described above, according to the seal structure of the high-pressure tank 1 of the present embodiment, the sealing means 50 interposed between the ferrule 3 and the valve body 4 is constituted of two O-rings 51 and 52 which are different in temperature characteristic. Therefore, even in a temperature environment where the elasticity of one O-ring (51 or 52) deteriorates, the elasticity of the other O-ring (52 or 51) is secured.

In consequence, even in a case where the temperature in the high-pressure tank 1 rises or drops, the space between the ferrule 3 and the valve body 4 can air-tightly be sealed by either of the two O-rings 51 and 52. Therefore, it is possible to properly secure the sealing capability between the ferrule 3 and the valve body 4 over a broad temperature range by effectively using an existing O-ring.

Moreover, in a case where the high-pressure tank 1 is applied to, for example, a fuel cell vehicle, the discharging of the hydrogen gas is more frequently performed than the filling of the hydrogen gas. That is to say, the temperature in the high-pressure tank 1 drops frequently or repeatedly as compared with a case where the temperature rises. As described above, since the first O-ring 51 having the low temperature resistance is disposed internally as viewed from the inside of the high-pressure tank 1, the sealing capability for the O-ring having a higher use frequency can be secured.

Moreover, the two O-rings 51 and 52 are different in gas permeability, and the second O-ring 52 having high gas permeability is disposed externally from the first O-ring 51 as viewed from the inside of the high-pressure tank. Therefore, the gas can be prevented from being stagnated between the O-rings (between 51 and 52).

Though the sealing means 50 is comprised of the two O-rings 51 and 52, the means may be comprised of a lip packing, a gasket and the like. Moreover, though both of the two O-rings 51 and 52 are used as an axial seal, an end-face seal may be used together. For example, a space between the lower end face 44 of the exposed portion 42 of the valve body 4 and the upper end face 34 of the flange portion 32 of the ferrule 3 may air-tightly be sealed with the second O-ring 52. In this case, instead of the O-ring, a gasket may be used.

Moreover, the sealing means 50 includes three or more seal members which are different in temperature characteristic. Furthermore, the arrangement of the first O-ring 51 and the second O-ring 52 may be reversed, and the second O-ring 52 having the high temperature resistance may be disposed internally as viewed from the inside of the high-pressure tank 1. A structure in which the backup rings 57 and 58 are not used together may be used.

Second Embodiment

Figure 3:
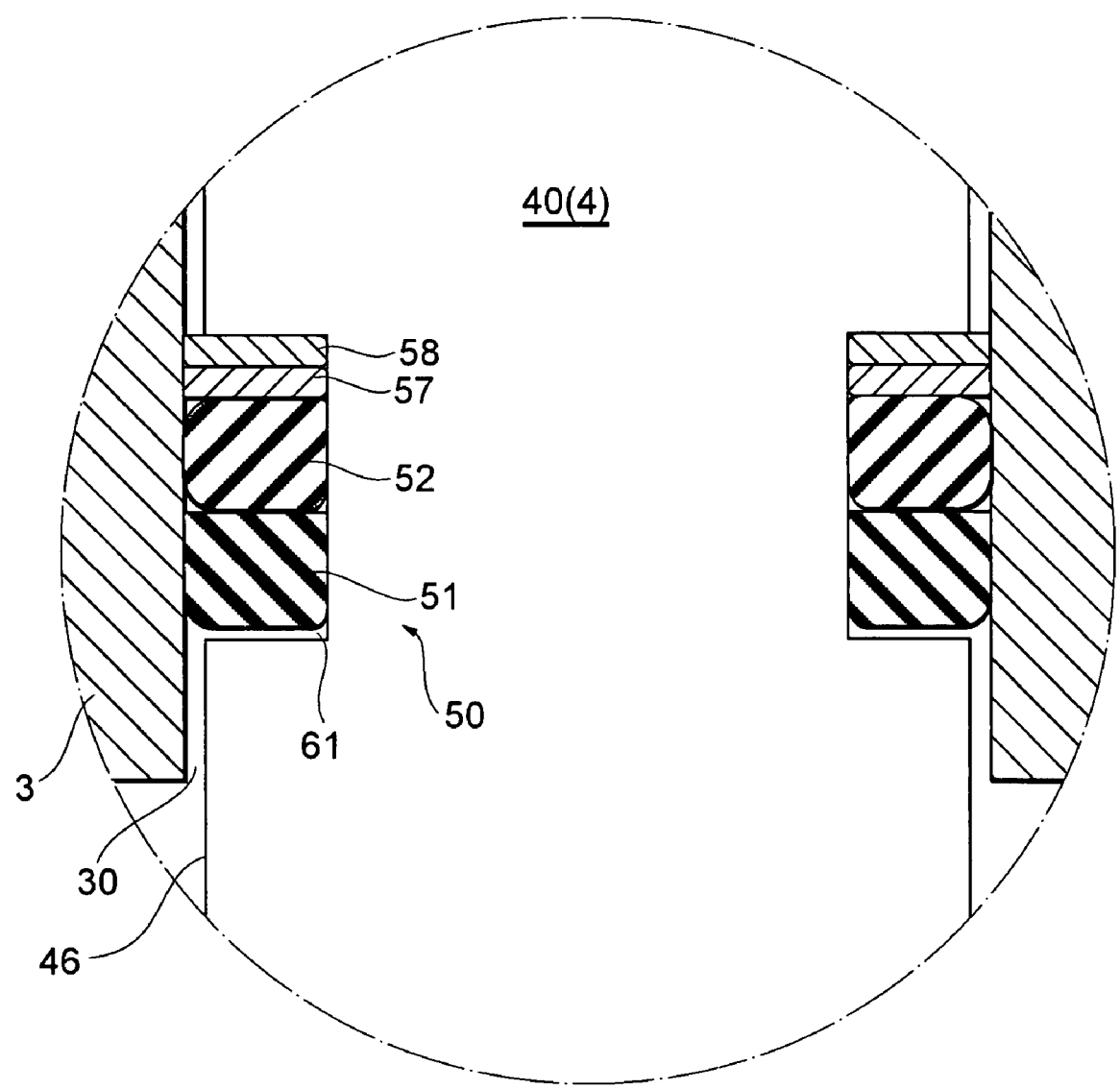
FIG. 3 is an enlarged view showing a main part of a seal structure around a ferrule and a valve body according to a second embodiment.

Next, a seal structure of a high-pressure tank 1 according to a second embodiment will be described with reference to FIG. 3. The present embodiment is different from the first embodiment in that two O-rings 51 and 52 of sealing means 50 are arranged in a common fitting groove 61. In the common fitting groove 61, the first O-ring 51 and the second O-ring 52 having the above properties and two backup rings 57, 58 are arranged adjacent to each other in order from an upstream side of the high-pressure tank 1.

According to the present embodiment, functions and effects similar to those described above can be obtained. For example, sealing capability can properly be secured over a broad temperature range. In addition, efficiency of a space around these seals can be improved and reduction in weight can be achieved. It is to be noted that the arrangement order of the first O-ring 51 and the second O-ring 52 may be reversed in the same manner as described above, and two or more O-rings (seal members) may be used. Furthermore, the backup rings 57, 58 may be arranged on opposite sides of these seal members.

Third Embodiment

Figure 4:
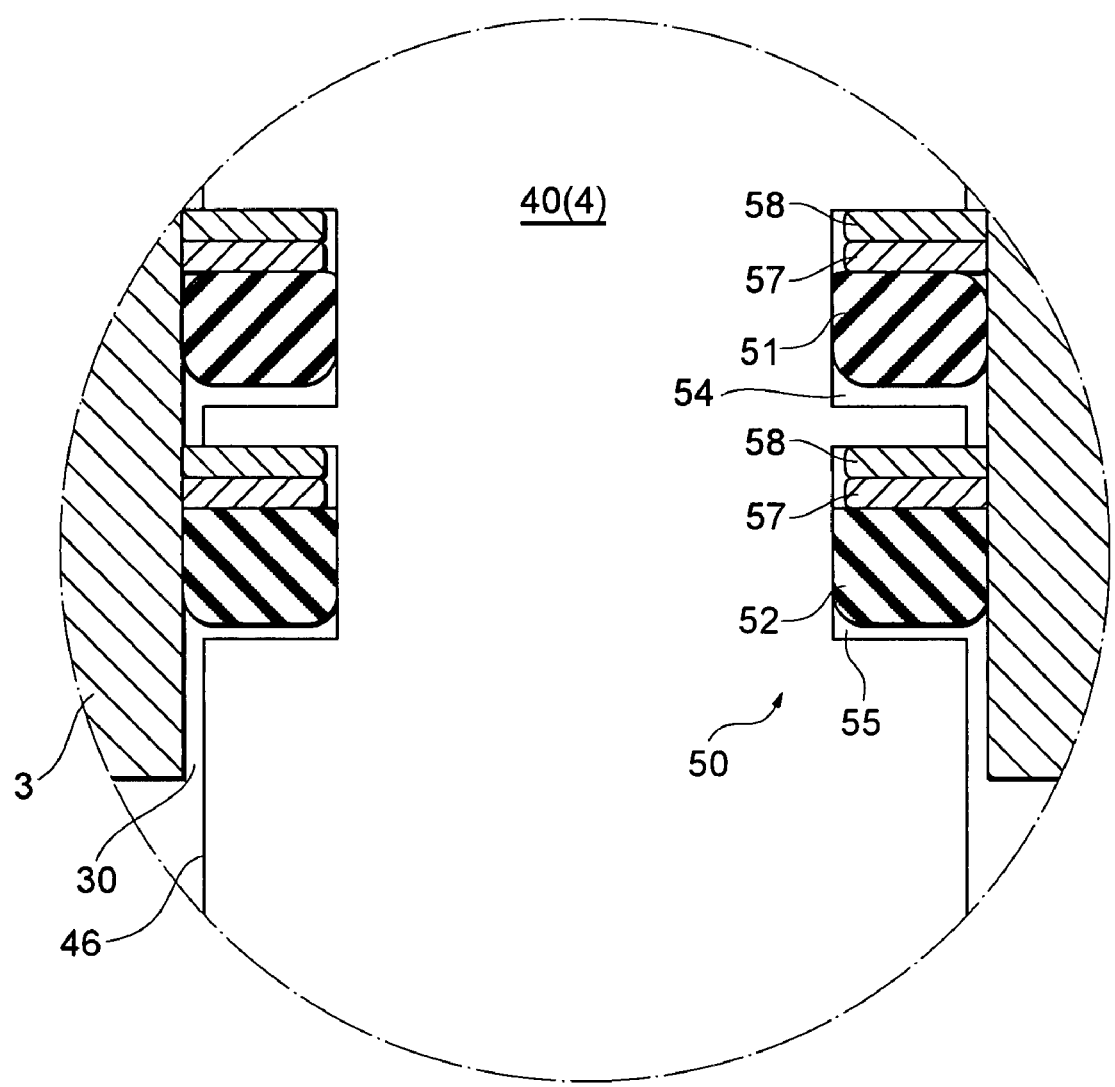
FIG. 4 is an enlarged view showing a main part of a seal structure around a ferrule and a valve body according to a third embodiment.

Next, a seal structure of a high-pressure tank 1 according to a third embodiment will be described with reference to FIG. 4. The present embodiment is different from the first embodiment mainly in that materials forming O-rings 51 and 52 of sealing means 50 are replaced.

First, a reason why the material is replaced will be described.

As described above, it is preferable to select a combination of the materials of the two O-rings 51 and 52 by taking into consideration a temperature change in the high-pressure tank 1. In this case, it is preferable to select the combination in accordance with a type and a pressure of a gas with which the high-pressure tank 1 is filled. The combination of the first embodiment described above, that is, a combination of the first O-ring 51 formed of IIR and the second O-ring 52 formed of EPDM is effective in a case where the tank is filled with a hydrogen gas of 35 MPa. However, in a case where the tank is filled with a hydrogen gas of 70 MPa, the O-ring needs to be durable against a low temperature during discharging of the gas as compared with the hydrogen gas of 35 MPa, and it is preferable to use the O-ring formed of a material having a low temperature characteristic more excellent than that of IIR.

Accordingly, in the present embodiment, the first O-ring 51 having low temperature resistance is formed of silicone having the low temperature characteristic more excellent than that of IIR. The second O-ring 52 having high temperature resistance is formed of EPDM. Elasticity of the first O-ring 51 formed of silicone does not deteriorate, and a close contact force can be secured even under a temperature environment where IIR and EPDM lose elasticity thereof at −50° C. or less.

However, it is considered that since the O-ring 51 formed of silicone has high gas permeability of the hydrogen gas as compared with the O-ring 52 formed of EPDM, there is a concern about sealing capability. However, in a case where leakage of gas from the high-pressure tank 1 is considered as described above, it is necessary to consider both of close contact properties between the O-rings 51 and 52 and a valve body 4 and the like, and material permeability of the O-rings 51 and 52 per se. Therefore, when hydrogen permeation is entirely considered, under the temperature environment where EPDM loses the elasticity thereof at −50° C. or less, the sealing capability of the O-ring 51 of silicone is higher than that of the O-ring 52 of EPDM. Therefore, the leakage of the gas can adequately be suppressed.

Next, an arrangement of the two O-rings 51 and 52 will be described.

In the present embodiment, the first O-ring 51 is disposed externally from the second O-ring 52 as viewed from the inside of the high-pressure tank 1. As described above, the first O-ring 51 having gas permeability of the material itself which is higher than that of the second O-ring 52 is disposed externally from the second O-ring 52 (on a secondary side). In consequence, the gas can adequately be prevented from being stagnated between the O-rings (between 51 and 52). It is to be noted that attachment grooves 54, 55 are arranged adjacent to two backup rings 57, 58, respectively, but the number, arrangement and configuration of the backup rings are not limited to those of this embodiment.

As described above, according to the present embodiment, sealing capability can properly be secured over a range of temperature that is broader than that of the first embodiment, especially in a low temperature range. Note that a modification described in the first embodiment can appropriately be applied even to the present embodiment.

Fourth Embodiment

Next, a seal structure of a high-pressure tank 1 according to a fourth embodiment will be described with reference to FIG. 5. The present embodiment is different from the first embodiment mainly in that a diameter of a valve body 4 is changed, and positions of arrangement of O-rings 51 and 52 which are sealing means 50 are changed.

The valve body 4 has a plurality of portions different in diameter as viewed in an axial direction. More specifically, a cylindrical portion 40 of the valve body 4 has a thread portion provided with an external screw 48, a small diameter portion 101 positioned internally from the external screw 48 in a tank body 2, and a large diameter portion 102 positioned externally from the external screw 48 outside the tank body 2. An effective diameter of the external screw 48 is set to be larger than an outer diameter D1 of the small diameter portion 101 and smaller than an outer diameter D2 of the large diameter portion 102.

The two O-rings 51 and 52 are formed of IIR and EPDM, respectively, and are arranged on opposite sides of the external screw 48 in the axial direction. Specifically, the first O-ring 51 is fitted together with a backup ring 111 in a fitting groove 54 formed in the small diameter portion 101. On the other hand, the second O-ring 52 is fitted together with a backup ring 112 in a fitting groove 55 formed in the large diameter portion 102. As described above, since the outer diameter D1 of the small diameter portion 101 is smaller than the outer diameter D2 of the large diameter portion 102, a diameter of the first O-ring 51 is smaller than that of the second O-ring 52.

An operation and an effect of the present embodiment will be described.

As described above, in the high-pressure tank 1 and the valve body 4, the temperature changes with filling and discharging of a hydrogen gas. At this time, the valve body 4 has a non-uniform temperature distribution in the axial direction of the body in some case. As the two O-rings 51 and 52 are arranged to be separated apart from each other in the axial direction of the valve body 4 as in the present embodiment, an influence of the temperature distribution of the valve body 4 can preferably be avoided as compared with a case where these rings are arranged in a concentrated manner at one end of the external screw 48. In consequence, it is possible to obtain a tightening property of the external screw 48 which is consistent with sealing capability of the two O-rings 51 and 52.

Moreover, since the diameter of the valve body 4 in the axial direction is set as described above, the O-ring 51 can be inhibited from being slid to an internal screw 38 in a case where the valve body 4 provided with the O-rings 51 and 52 is screwed into and connected to the ferrule 3. In consequence, durability of the O-ring 51 can be improved. Furthermore, since gas permeability of the outer O-ring 52 is higher than that of the inner O-ring 51, the gas can preferably be inhibited from being stagnated between the internal screw 38 and the external screw 48 at a low temperature and a low pressure.

Note that even in the present embodiment, materials of two O-rings 51 and 52 described in the third embodiment may be applied. That is, the O-ring on a small diameter portion 101 side may be formed of EPDM, and the O-ring on a large diameter portion 102 side may be formed of silicone.

Another Embodiment

In the above embodiments, a seal structure of a high-pressure tank 1 has been described in accordance with an example in which a seal member (a first O-ring 51 and a second O-ring 52) is arranged between a ferrule 3 and a valve body 4.

However, needless to say, this seal structure (sealing means 50) may be applied to another portion of the high-pressure tank 1.

Figure 5:
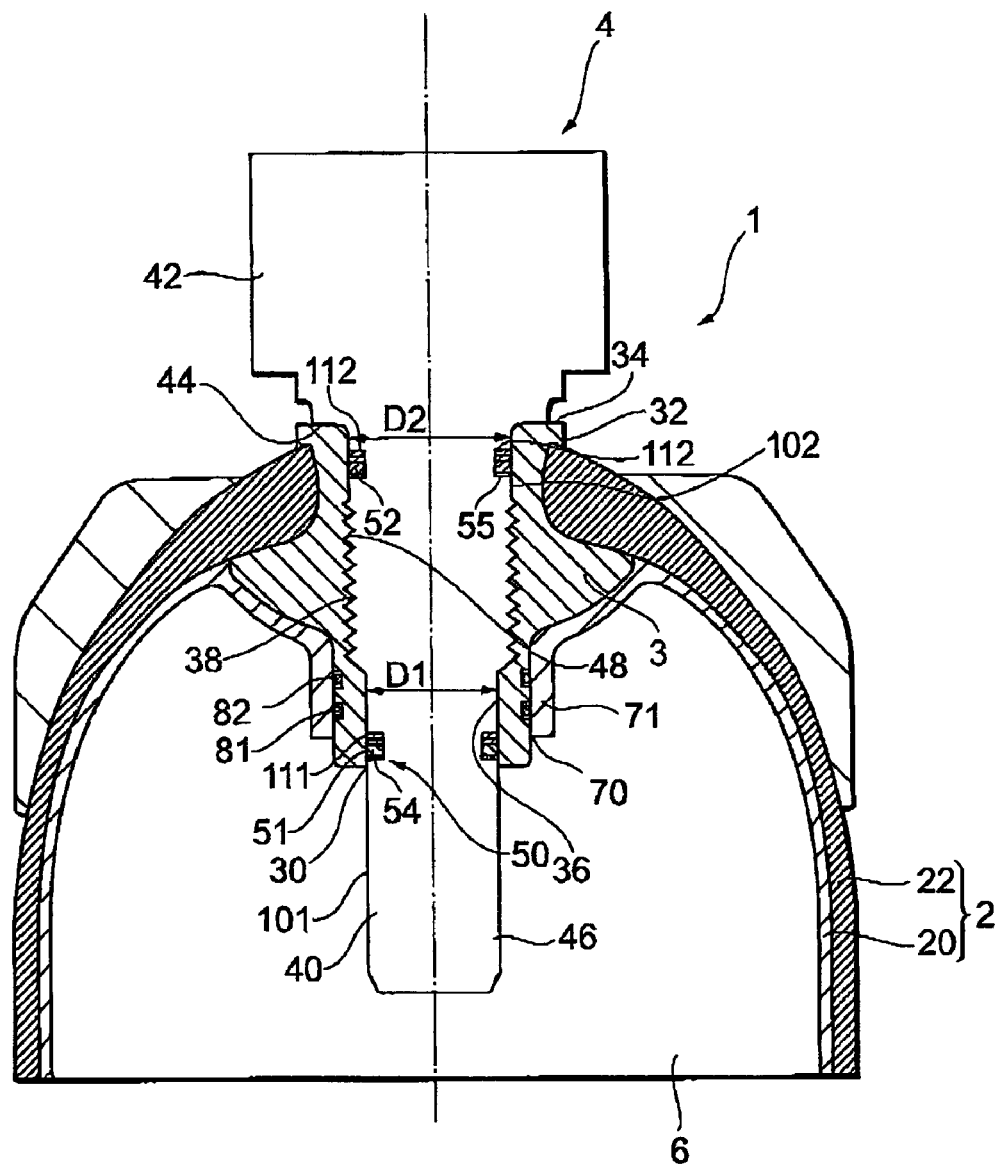
FIG. 5 is a cross-sectional view showing a configuration of a high-pressure tank according to a fourth embodiment.

For example, as shown in FIGS. 1 and 5, when the structure is applied between an opening 70 of the liner 20 and the ferrule 3 (an attachment member) attached to this opening, two seal members 81, 82 which perform axial sealing are arranged between an inner peripheral surface (an opening edge portion) of the opening 70 and an outer peripheral surface of the ferrule 4. One seal member 81 may be constituted of a material having a property similar to that of, for example, the O-ring 51 (a material such as IIR), and the other seal member 82 may be comprised of a material having a property similar to that of, for example, the O-ring 52 (a material such as EPDM). Alternatively, as in the third embodiment, the seal member 81 may be formed of EPDM and the seal member 82 may be formed of silicone. The opening 70 is mainly constituted on an inner peripheral side of a return portion 71 which secures strength of the liner 20.

Moreover, in a case where the tank body 2 and the ferrule 3 are constituted of another structure, and in a case where, in relation to this case, functional components such as the valve body 4 are constituted of another structure, the sealing means 50 of the present invention may be applicable to another portion (not shown). For example, when the valve body 4 is fitted into an opening of the liner 20, the sealing means 50 may be disposed between the opening edge portion of the opening of the liner and the outer peripheral surface of the valve body 4. When the ferrule 3 is fitted into an opening of the shell 22, the sealing means 50 may be disposed between the opening edge portion of the opening of the shell and an outer peripheral surface of the ferrule 3. Furthermore, when the valve body 4 is fitted into the opening of the shell 22, the sealing means 50 may be disposed between the opening edge portion of the opening of the shell and the outer peripheral surface of the valve body 4.

The invention claimed is:

1. A seal structure of a high-pressure tank between an opening of the high-pressure tank and an attachment member attached to the opening, comprising:
   a plurality of seal members having mutually different seal properties, the plurality of seal members having elasticity and being non-metallic, the plurality of seal members installed between an opening edge portion defining the opening and the attachment member,
   wherein:
      the plurality of seal members are different in temperature characteristic thereof from each other,
      the plurality of seal members includes a first seal member and a second seal member,
      the first seal member causes less leakage than the second seal member at a first temperature,
      the second seal member causes less leakage than the first seal member at a second temperature higher than the first temperature,
      the first seal member and the second seal member are different in gas permeability from each other, and
      the seal member having high gas permeability is positioned externally from the seal member having low gas permeability as viewed from the inside of the high-pressure tank,
   wherein the first seal member is formed of silicone and the second seal member is formed of EPDM in a case where the high-pressure tank is used for a hydrogen gas of 70 MPa.

2. The seal structure of the high-pressure tank according to claim 1, wherein the first seal member and the second seal member are arranged in series between an inner peripheral surface of the opening edge portion and an outer peripheral surface of the attachment member along an axial direction of the high-pressure tank.

3. The seal structure of the high-pressure tank according to claim 2, wherein fitting grooves, in which the first seal member and the second seal member are individually arranged, are formed in at least one of the inner peripheral surface of the opening edge portion and the outer peripheral surface of the attachment member.

4. The seal structure of the high-pressure tank according to claim 2, wherein a single fitting groove, in which both of the first seal member and the second seal member are arranged, is formed in at least one of the inner peripheral surface of the opening edge portion and the outer peripheral surface of the attachment member.

5. The seal structure of the high-pressure tank according to claim 3, wherein a backup ring is further arranged in the fitting groove.

6. A seal structure of a high-pressure tank between an opening of the high-pressure tank and an attachment member attached to the opening, comprising:
   a plurality of seal members having mutually different seal properties, the plurality of seal members having elasticity and being non-metallic, the plurality of seal members installed between an opening edge portion defining the opening and the attachment member,
   wherein:
      the plurality of seal members are different in temperature characteristic thereof from each other,
      the plurality of seal members includes a first seal member and a second seal member,
      the first seal member causes less leakage than the second seal member at a first temperature,
      the second seal member causes less leakage than the first seal member at a second temperature higher than the first temperature,
      the first seal member and the second seal member are different in gas permeability from each other, and
      the seal member having high gas permeability is positioned externally from the seal member having low gas permeability as viewed from the inside of the high-pressure tank,
   wherein the first seal member is formed of IIR and the second seal member is formed of EPDM in a case where the high-pressure tank is used for a hydrogen gas of 35 MPa.

* * * * *